US012603455B2

(12) United States Patent
Hsu et al.

(10) Patent No.: US 12,603,455 B2
(45) Date of Patent: Apr. 14, 2026

(54) ELECTRICAL CONNECTOR WITH ONE-PIECE FIRST CASING

(71) Applicant: TELEBOX INDUSTRIES CORP., Hsichih-Taipei (TW)

(72) Inventors: Ching-Yi Hsu, Keelung City (TW); Hung Yu Wu, Keelung City (TW)

(73) Assignee: TELEBOX INDUSTRIES CORP., Hsichih-Taipei (TW)

( * ) Notice: Subject to any disclaimer, the term of this patent is extended or adjusted under 35 U.S.C. 154(b) by 302 days.

(21) Appl. No.: 18/510,114

(22) Filed: Nov. 15, 2023

(65) Prior Publication Data

US 2025/0105546 A1 Mar. 27, 2025

(30) Foreign Application Priority Data

Sep. 26, 2023 (TW) ................................ 112210425

(51) Int. Cl.

*H01R 13/512* (2006.01)
*H01R 4/2429* (2018.01)
*H01R 13/52* (2006.01)

(52) U.S. Cl.

CPC ......... *H01R 13/512* (2013.01); *H01R 4/2429* (2013.01); *H01R 13/5202* (2013.01)

(58) Field of Classification Search

CPC ........................... H01R 13/512; H01R 4/2429; H01R 13/5202; H01R 24/86; H01R 13/5205; H01R 13/59; H01R 13/6592; H01R 13/502

See application file for complete search history.

(56) References Cited

U.S. PATENT DOCUMENTS 5,580,278 A * 12/1996 Fowler ................ H01R 13/622 439/321
7,625,226 B1 * 12/2009 Gastineau ........... H01R 13/639 439/321
8,435,066 B2 * 5/2013 Myong ............... H01R 13/502 439/452

(Continued)

FOREIGN PATENT DOCUMENTS

CN 110299653 A * 10/2019 ........... H01R 13/502

OTHER PUBLICATIONS

Machine Translation CN-110299653-A, (dated Oct. 1, 2019) (Year: 2025).*

*Primary Examiner* — Travis S Chambers
(74) *Attorney, Agent, or Firm* — Maschoff Brennan

(57) ABSTRACT

An electrical connector is configured to be assembled with a joint. The electrical connector includes an outer casing, a seat body and a plurality of insulation-displacement contacts. The outer casing includes a first casing and a second casing. The first casing includes an accommodation portion, a threaded portion and a connection portion, the accommodation portion and the threaded portion are integrally connected to each other via the connection portion. The accommodation portion is configured to be assembled with the joint, the threaded portion and the second casing are screwed with each other, and the first casing and the second casing together form an accommodation space. The seat body is disposed in the accommodation space. The insulation-displacement contacts are fixed to the seat body and extend to the accommodation portion.

9 Claims, 7 Drawing Sheets

(56) References Cited

U.S. PATENT DOCUMENTS

| | | | | |
|---|---|---|---|---|
| 2013/0323962 | A1* | 12/2013 | Chien | H01R 4/2433<br>439/393 |
| 2017/0170577 | A1* | 6/2017 | Starke | H01R 13/59 |
| 2022/0311193 | A1* | 9/2022 | Gerber | H01R 4/2433 |
| 2023/0253720 | A1* | 8/2023 | Jin | H01R 43/01<br>439/404 |

* cited by examiner

ELECTRICAL CONNECTOR WITH ONE-PIECE FIRST CASING

CROSS-REFERENCE TO RELATED APPLICATIONS

This non-provisional application claims priority under 35 U.S.C. § 119 (a) on Patent Application No(s). 112210425 filed in Taiwan, R.O.C. on Sep. 26, 2023, the entire contents of which are hereby incorporated by reference.

TECHNICAL FIELD

The disclosure relates to an electrical connector.

BACKGROUND

In general, one end of a cable may be provided with an electrical connector for being assembled with another electrical connector of an electronic device or another cable. In the electrical connector provided at one end of the cable, an outer casing of the electrical connector consists of at least three pieces of components, and sealing rings should be further provided at positions where these components are connected for achieving water-proof requirements. As a result, there is a large number of components of the electrical connector that requires manual assembly, leading to extended assembly time of the electrical connector and making it difficult to reduce the material cost of the electrical connector.

SUMMARY

The disclosure provides an electrical connector which can reduce assembly time and material costs of the electrical connector.

One embodiment of the disclosure provides an electrical connector. The electrical connector is configured to be assembled with a joint. The electrical connector includes an outer casing, a seat body and a plurality of insulation-displacement contacts. The outer casing includes a first casing and a second casing. The first casing includes an accommodation portion, a threaded portion and a connection portion, the accommodation portion and the threaded portion are integrally connected to each other via the connection portion. The accommodation portion is configured to be assembled with the joint, the threaded portion and the second casing are screwed with each other, and the first casing and the second casing together form an accommodation space. The seat body is disposed in the accommodation space. The insulation-displacement contacts are fixed to the seat body and extend to the accommodation portion.

According to the electrical connector as discussed in the above embodiment, in the first casing of the outer casing, the accommodation portion and the threaded portion are integrally connected to each other via the connection portion, such that there is no need to assembled the accommodation portion, the threaded portion and the connection portion of the first casing with one another, and sealing rings are not required to be provided at positions where the accommodation portion, the threaded portion and the connection portion are connected, which saves time spending on assembling the accommodation portion, the threaded portion and the connection portion with one another and saves material cost of the sealing rings.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
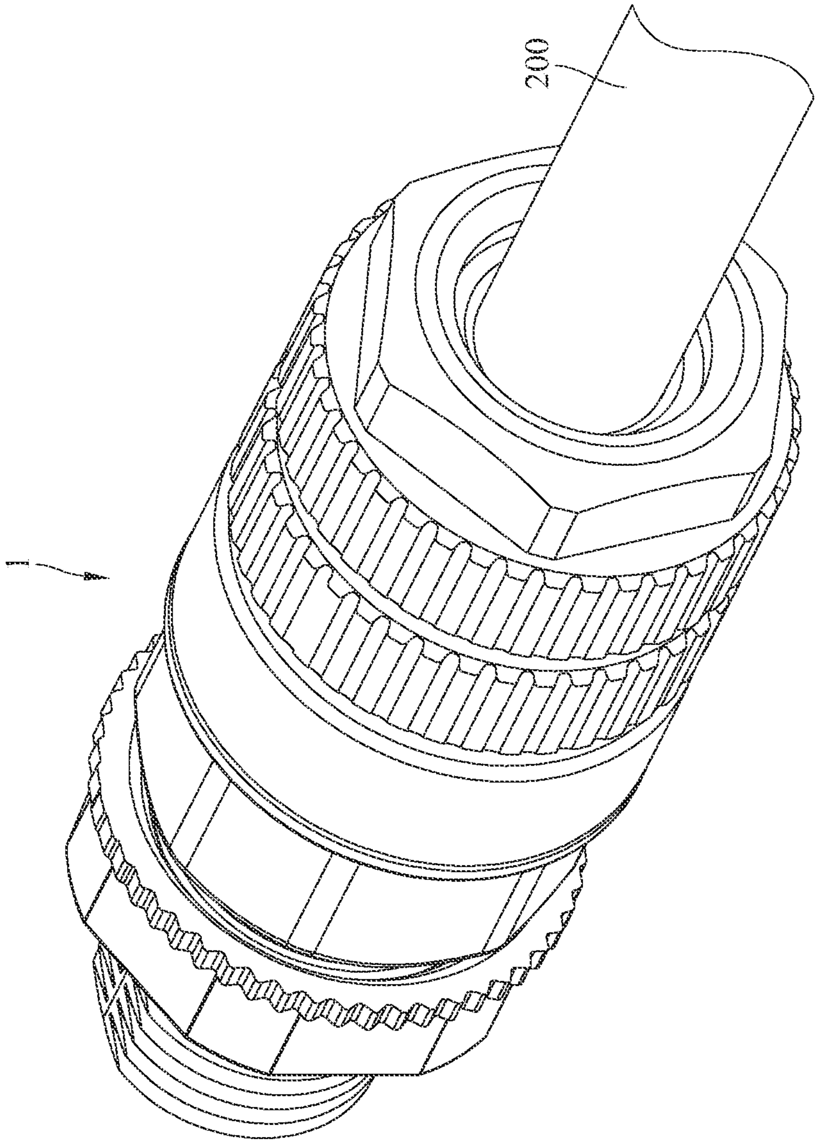
FIG. 1 is a perspective view of an electrical connector according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
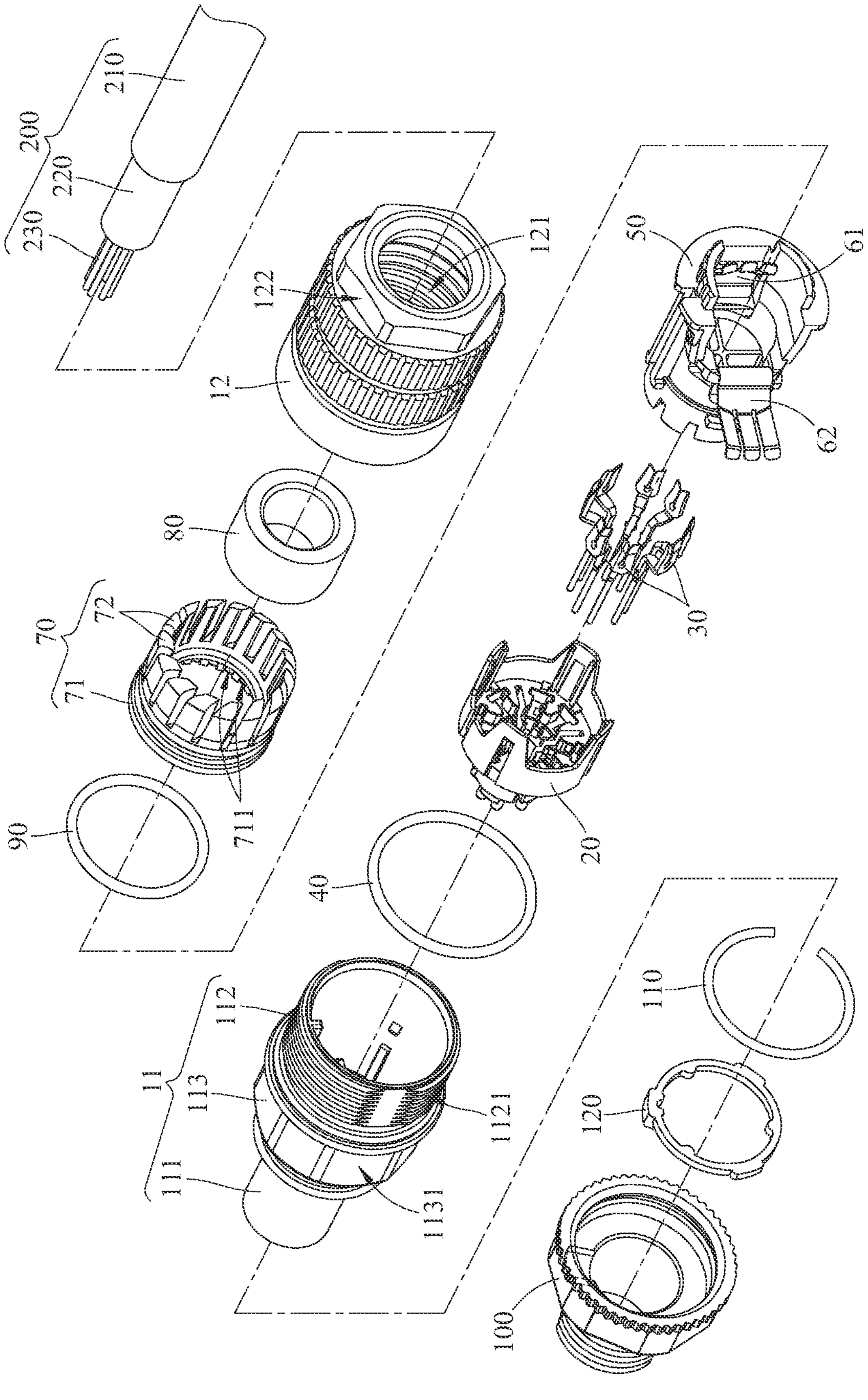
FIG. 2 is an exploded view of the electrical connector in FIG. 1.
Figure 3:
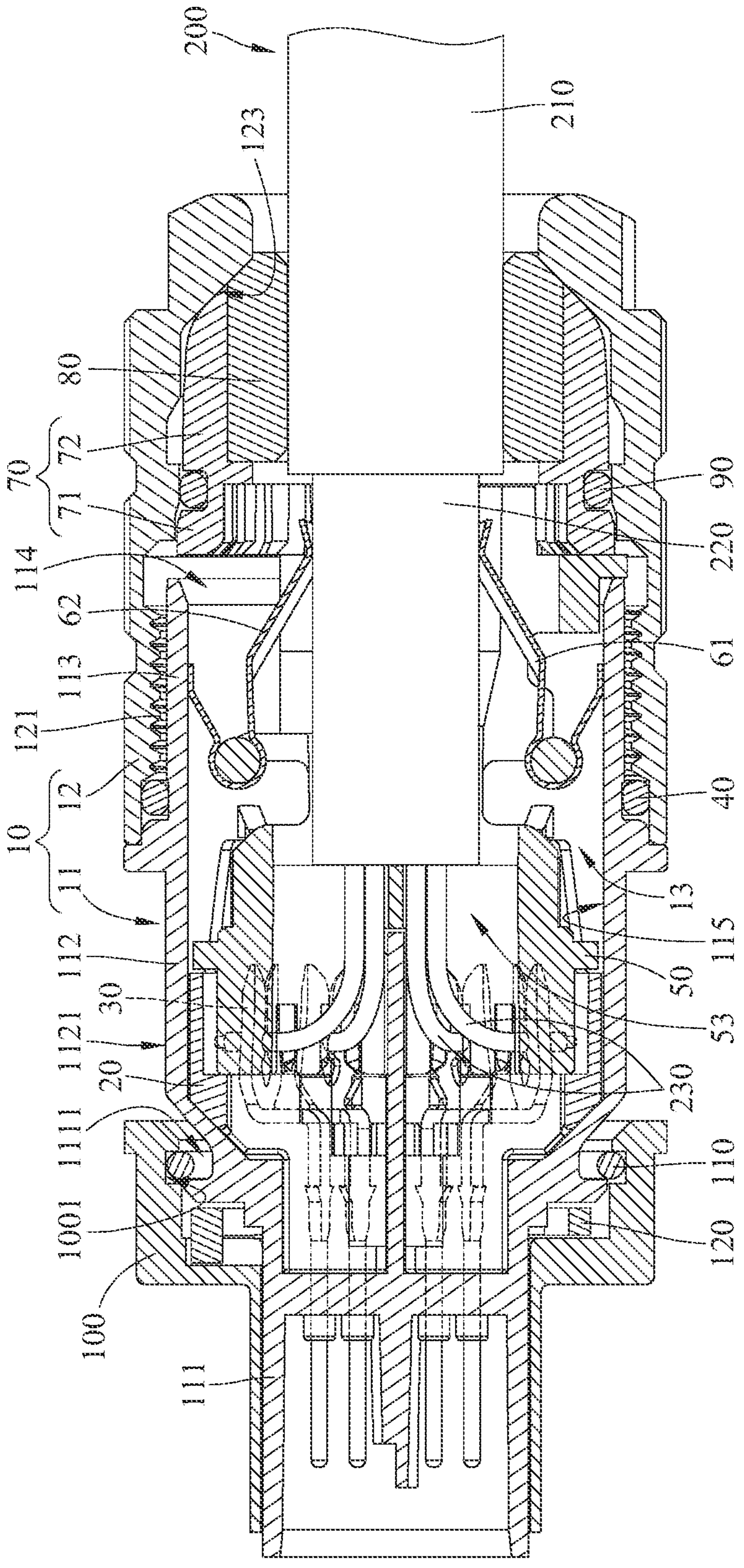
FIG. 3 is a cross-sectional view of the electrical connector in FIG. 1.

Referring to FIGS. 1 to 3, FIG. 1 is a perspective view of an electrical connector 1 according to one embodiment of the disclosure, FIG. 2 is an exploded view of the electrical connector 1 in FIG. 1, and FIG. 3 is a cross-sectional view of the electrical connector 1 in FIG. 1.

In this embodiment, the electrical connector 1 is configured to be disposed on one end of a cable 200, and the electrical connector 1 is configured to be assembled with a joint (not shown). The cable 200 includes an insulation layer 210, a shielding layer 220 and a plurality of wires 230 arranged from outside to inside. At one end of the cable 200, the shielding layer 220 and the wires 230 are exposed from the insulation layer 210. The joint may be an electrical connector of an electronic device or an electrical connector disposed on one end of another cable.

The electrical connector 1 includes an outer casing 10, a seat body 20 and a plurality of insulation-displacement contacts 30. In addition, the electrical connector 1 may further include a first sealing ring 40, an annular wire holder 50, two ground sheets 61 and 62, a pressing component 70, a second sealing ring 80, a third sealing ring 90, a coupling component 100, a positioning component 110 and an anti-slip ring 120.

Figure 4:
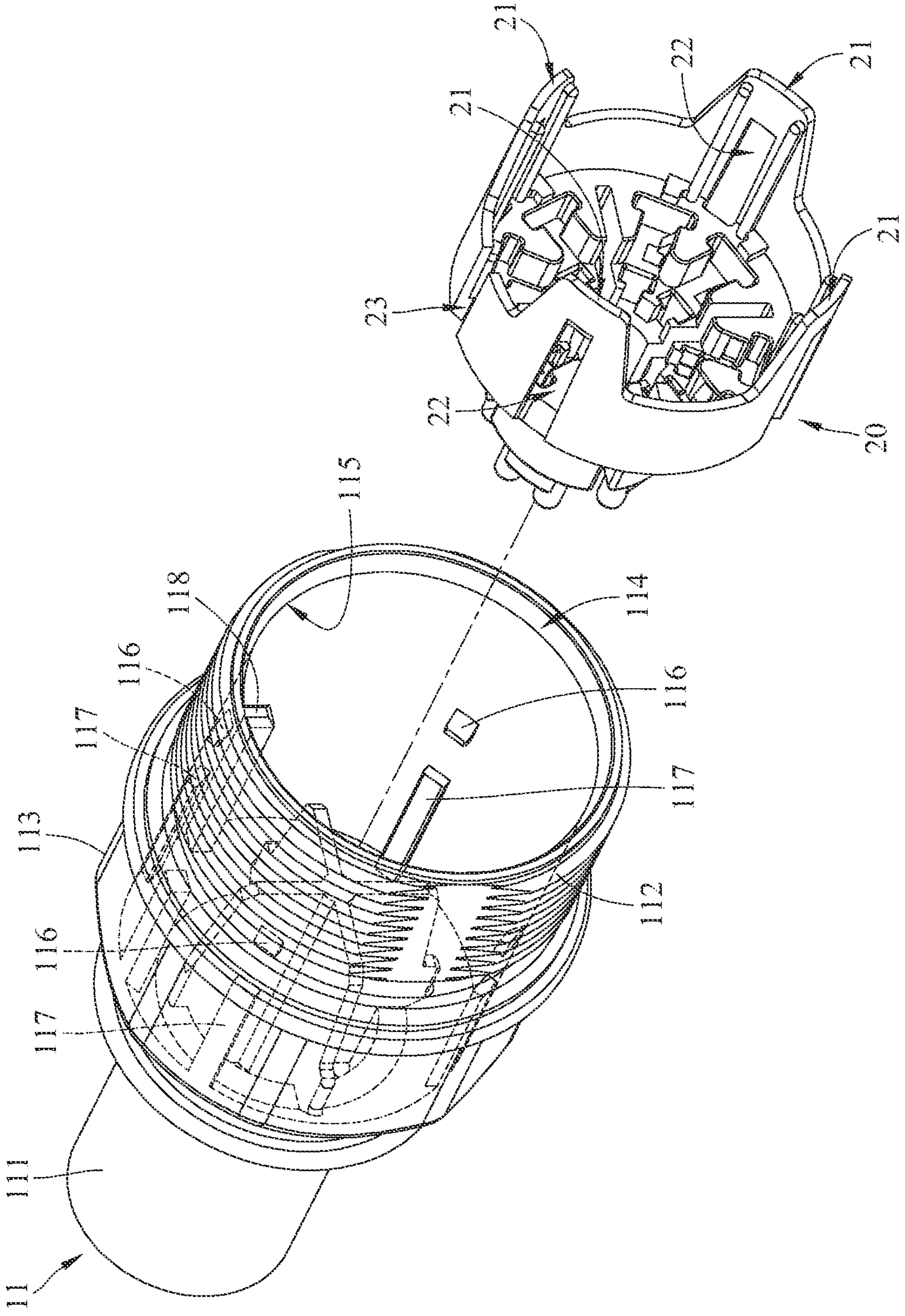
FIG. 4 is an exploded view of a first casing and a seat body in FIG. 2.

Then, referring to FIGS. 2 to 4, FIG. 4 is an exploded view of a first casing 11 and a seat body 20 in FIG. 2.

The outer casing 10 includes a first casing 11 and a second casing 12. The first casing 11 is made of metal material, such as zinc alloy. The first casing 11 includes an accommodation portion 111, a threaded portion 112 and a connection portion

113. The accommodation portion 111 and the threaded portion 112 are integrally connected to each other via the connection portion 113.

In the first casing 11 of the outer casing 10 of this embodiment, the accommodation portion 111 and the threaded portion 112 are integrally connected to each other via the connection portion 113, such that there is no need to assembled the accommodation portion 111, the threaded portion 112 and the connection portion 113 of the first casing 11 with one another, and sealing rings are not required to be provided at positions where the accommodation portion 111, the threaded portion 112 and the connection portion 113 are connected, which saves time spending on assembling the accommodation portion 111, the threaded portion 112 and the connection portion 113 with one another and saves material cost of the sealing rings.

Figure 6:
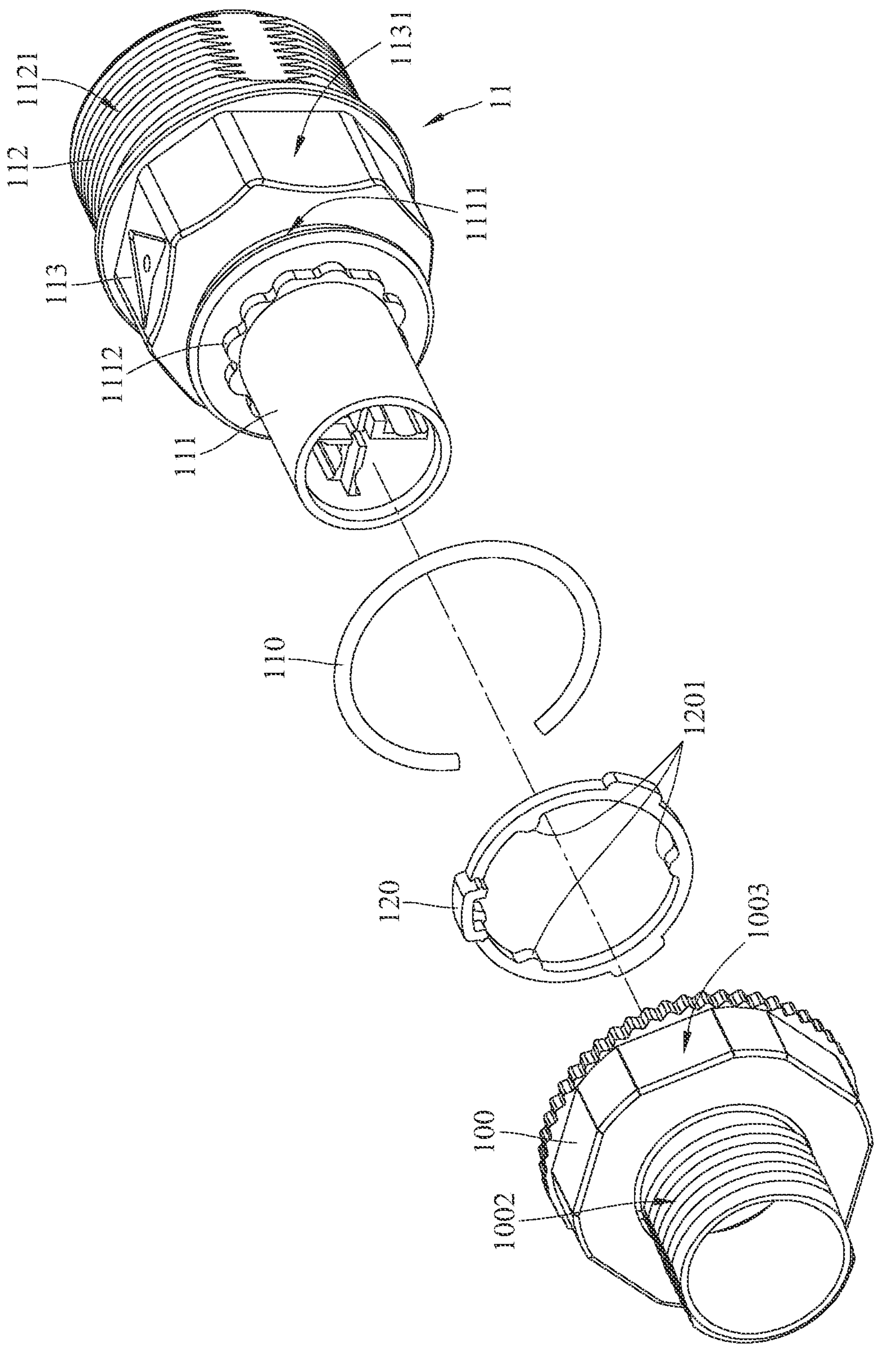
FIG. 6 is an exploded view of the first casing, a positioning component, a coupling component and an anti-slip ring in FIG. 2.

The threaded portion 112 of the first casing 11 has an outer threaded structure 1121, and the connection portion 113, for example but not limited to, has an octagonal profile 1131 (shown in FIG. 6). The second casing 12 is, for example, made of metal material, such as brass. The second casing 12 has an inner threaded structure 121 and a hexagonal profile 122. A hand tool (e.g., a wrench) can be engaged with the hexagonal profile 122 of the second casing 12 to rotate the second casing 12, such that the inner threaded structure 121 of the second casing 12 and the outer threaded structure 1121 of the threaded portion 112 of the first casing 11 are screwed with each other for making the first casing 11 and the second casing 12 to form an accommodation space 13 together. Alternatively, the hand tool can be used to detach the second casing 12 from the first casing 11.

The first sealing ring 40 is clamped between the threaded portion 112 of the first casing 11 and the second casing 12 for preventing moisture from entering into the accommodation space 13 through a gap between the threaded portion 112 of the first casing 11 and the second casing 12. Note that the first sealing ring 40 is an optional component and may be used or omitted according to actual requirements.

In this embodiment, the first casing 11 has an opening 114, an inner annular surface 115, a plurality of first engagement blocks 116, a plurality of second engagement blocks 117 and a guide rib 118. The opening 114 is located at the threaded portion 112 of the first casing 11. A periphery of one side of the inner annular surface 115 forms the opening 114, and the inner annular surface 115 surrounds a part of the accommodation space 13 and extends from the threaded portion 112 to the accommodation portion 111. The first engagement blocks 116 and the second engagement blocks 117 protrude from the inner annular surface 115. The first engagement blocks 116 are located closer to the opening 114 than the second engagement blocks 117, and the first engagement blocks 116 are aligned with the second engagement blocks 117 along an axial direction of the first casing 11. The guide rib 118 protrudes from the inner annular surface 115 and extends from the opening 114 towards the accommodation portion 111, and the guide rib 118 is located between two of the first engagement blocks 116 and between two of the second engagement blocks 117 along a circumferential direction of the first casing 11.

The seat body 20 is, for example, made of a composite material containing nylon and glass fiber. The seat body 20 has a plurality of end edges 21, a plurality of engagement recesses 22 and a guide slot 23. The end edges 21 are spaced apart from each other in a circumferential direction of the seat body 20. The engagement recesses 22 are respectively aligned with the end edges 21 in an axial direction of the seat body 20, and the engagement recesses 22 are respectively spaced apart from the end edges 21. The guide slot 23 extends along the axial direction of the seat body 20, and the guide slot 23 is located between two of the engagement recesses 22 in the circumferential direction of the seat body 20. During the installation of the seat body 20 into the accommodation space 13, the cooperation of the guide slot 23 of the seat body 20 and the guide rib 118 of the first casing 11 can guide the seat body 20 into the accommodation space 13, such that the end edges 21 of the seat body 20 are respectively engaged with the first engagement blocks 116, and the engagement recesses 22 of the seat body 20 are respectively engaged with the second engagement blocks 117. As a result, the seat body 20 is positioned and fixed in the accommodation space 13.

Note that the engagement recesses 22 of the seat body 20 and the first engagement blocks 116 and the second engagement blocks 117 of the first casing 11 are optional structures; that is, the seat body 20 is not restricted to being fixed in the first casing 11 via a snap-fit manner. In some other embodiments, the seat body may be fixed in the first casing via other manners, such as adhering.

The insulation-displacement contacts 30 are fixed to the seat body 20 and are arranged along the circumferential direction of the seat body 20. The insulation-displacement contacts 30 extend from the seat body 20 to the accommodation portion 111 of the first casing 11.

Figure 5:
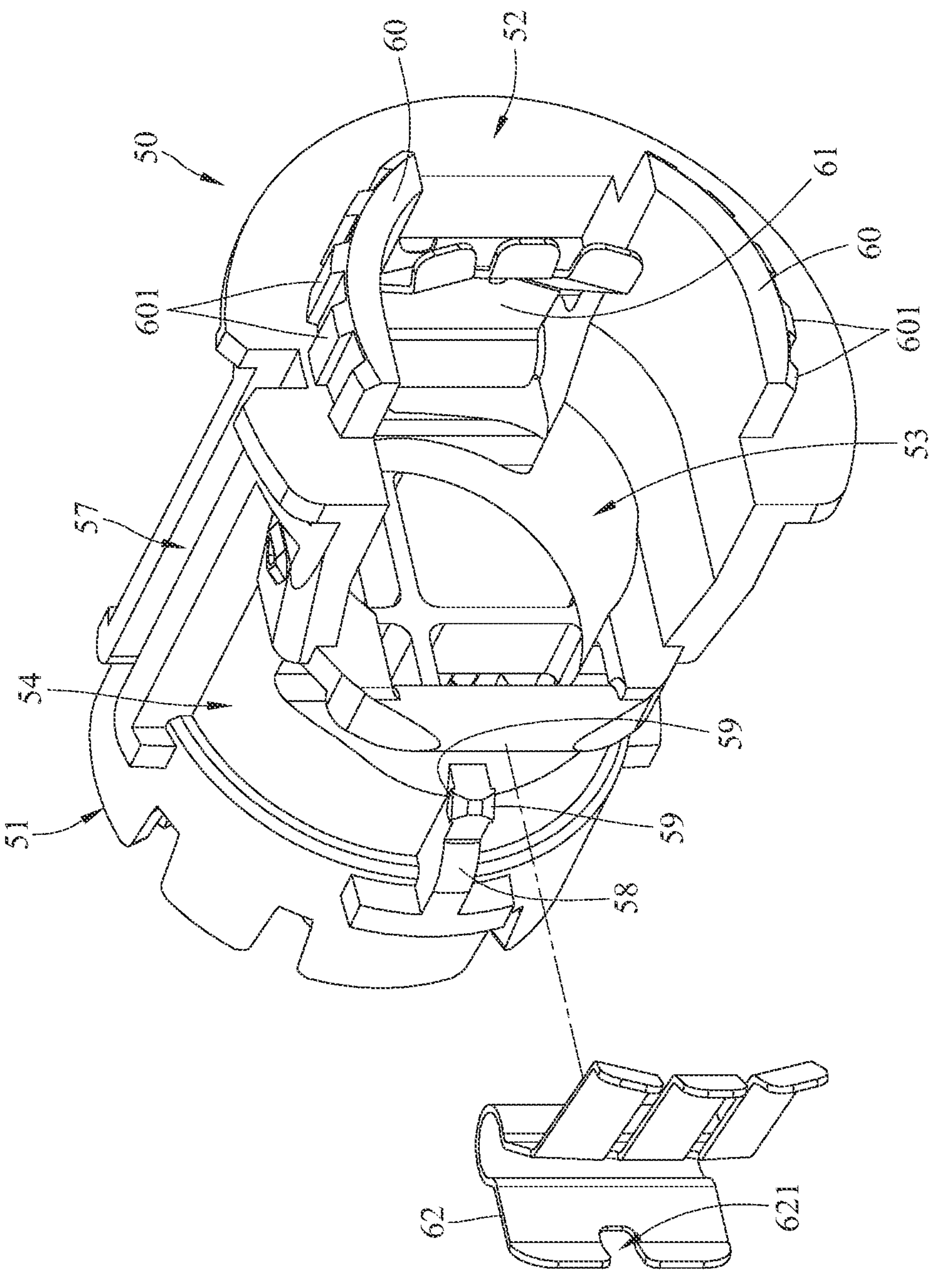
FIG. 5 is an exploded view of an annular wire holder and ground sheets in FIG. 2.

Then, referring to FIGS. 2, 3 and 5, FIG. 5 is an exploded view of the annular wire holder 50 and the ground sheets 61 and 62 in FIG. 2.

The annular wire holder 50 is, for example, made of plastic material, such as polycarbonate. The annular wire holder 50 has a first end surface 51, a second end surface 52, a central hole 53 and an outer annular surface 54. The first end surface 51 and the second end surface 52 are located at two opposite sides of the central hole 53. The outer annular surface 54 faces away from the central hole 53. The central hole 53 of the annular wire holder 50 is configured for one end of the cable 200 to be inserted thereinto, such that the shielding layer 220 of the cable 200 is located in the central hole 53, and the wires 230 of the cable 200 are positioned on the annular wire holder 50.

In this embodiment, the annular wire holder 50 may further have a mount slot 57. The mount slot 57 is located at the outer annular surface 54 and extends along an axial direction of the annular wire holder 50. The mount slot 57 of the annular wire holder 50 is cooperated with the guide rib 118 of the first casing 11 to guide the movement of the annular wire holder 50 into the accommodation space 13 and restrict the rotation movement of the annular wire holder 50 relative to the first casing 11. The insulation-displacement contacts 30 respectively pierce the wires 230 of the cable 200 so as to be electrically connected to the wires 230.

Note that the guide rib 118 of the first casing 11, the guide slot 23 of the seat body 20 and the mount slot 57 of the annular wire holder 50 are optional structures and may be omitted in some other embodiments.

The ground sheet 61 is fixed at one side of the annular wire holder 50 and is partially located in the central hole 53. The ground sheet 62 is movably disposed on another side of the annular wire holder 50 and is partially located in the central hole 53. The ground sheets 61 and 62 are in electrical contact with the shielding layer 220 of the cable 200 and the first casing 11.

As shown in FIGS. 2 and 5, in this embodiment, the annular wire holder 50 may further have a rib 58 and two positioning flanges 59. The rib 58 protrudes from the outer annular surface 54, and the positioning flanges 59 respectively protrude from two opposite sides of the rib 58. The ground sheet 62 has a positioning slot 621. Before the cable 200 is inserted into the central hole 53 of the annular wire holder 50, the ground sheet 62 can be moved away from the central hole 53 in advance, such that the rib 58 of the annular wire holder 50 passes through the positioning slot 621 of the ground sheet 62, and the positioning flanges 59 are engaged with the ground sheet 62, thereby preventing the ground sheet 62 from interfering the insertion of the cable 200 into the central hole 53 of the annular wire holder 50. After the cable 200 is inserted into the central hole 53 of the annular wire holder 50, the ground sheet 62 can be disengaged from the positioning flanges 59 of the annular wire holder 50 for electrically contacting the shielding layer 220 of the cable 200.

In this embodiment, the ground sheet 62 is engaged with the rib 58 via the positioning flanges 59 of the annular wire holder 50, but the disclosure is not limited thereto; in some other embodiments, the annular wire holder may not have the positioning flanges, and the ground sheet may be directly engaged with the rib. In another embodiment, the annular wire holder may not have rib. Furthermore, the ground sheet 62 is not restricted to being movable relative to the annular wire holder 50. In some other embodiments, the ground sheet may be immovable relative to the annular wire holder. Moreover, the quantity of the ground sheets may be modified, or the ground sheets may be omitted according to actual requirements.

In this embodiment, the annular wire holder 50 may further have two mount portions 60. The mount portions 60 protrude from two opposite sides of the second end surface 52. Each of the mount portions 60 has a plurality of protrusions 601. The pressing component 70 includes a fixed portion 71 and a plurality of flexible portions 72. The flexible portions 72 protrude from one side of the fixed portion 71 and are spaced apart from one another. The fixed portion 71 has a plurality of engagement recesses 711. The engagement recesses 711 of the fixed portion 71 are respectively engaged with the protrusions 601, such that two opposite sides of the pressing component 70 are respectively engaged with the mount portions 60, and the cable 200 is surrounded by the pressing component 70.

The second sealing ring 80 and the third sealing ring 90 are, for example, made of rubber material. The second sealing ring 80 is disposed between the flexible portions 72 of the pressing component 70 and the insulation layer 210 of the cable 200, and the third sealing ring 90 is sleeved on the fixed portion 71 of the pressing component 70. The second casing 12 surrounds the pressing component 70, and the second casing 12 has an inner tapered surface 123. The inner tapered surface 123 of the second casing 12 presses against the flexible portions 72 of the pressing component 70 for forcing the flexible portions 72 to press the second sealing ring 80 against the insulation layer 210 of the cable 200. In addition, the third sealing ring 90 is clamped by the second casing 12 and the fixed portion 71 of the pressing component 70.

In this embodiment, the fixed portion 71 of the pressing component 70 is fixed to the mount portion 60 of the annular wire holder 50, which can prevent the second casing 12 from driving the pressing component 70 to twist and damage the cable 200 during the rotation of the second casing 12 relative to the first casing 11. Note that the pressing component 70 is not restricted to being fixed to the mount portions 60 of the annular wire holder 50 via the protrusions and the recesses; in some other embodiments, the pressing component may be fixed to the mount portions of the annular wire holder via adhering manner. Alternatively, the pressing component may be integrally connected to the annular wire holder.

In this embodiment, the second sealing ring 80 can prevent moisture from entering into the accommodation space 13 through a gap between the cable 200 and the pressing component 70, and the third sealing ring 90 can prevent moisture from entering into the accommodation space 13 through a gap between the pressing component 70 and the second casing 12. Note that the second sealing ring 80 and the third sealing ring 90 are optional components and may be omitted in some other embodiments.

Figure 7:
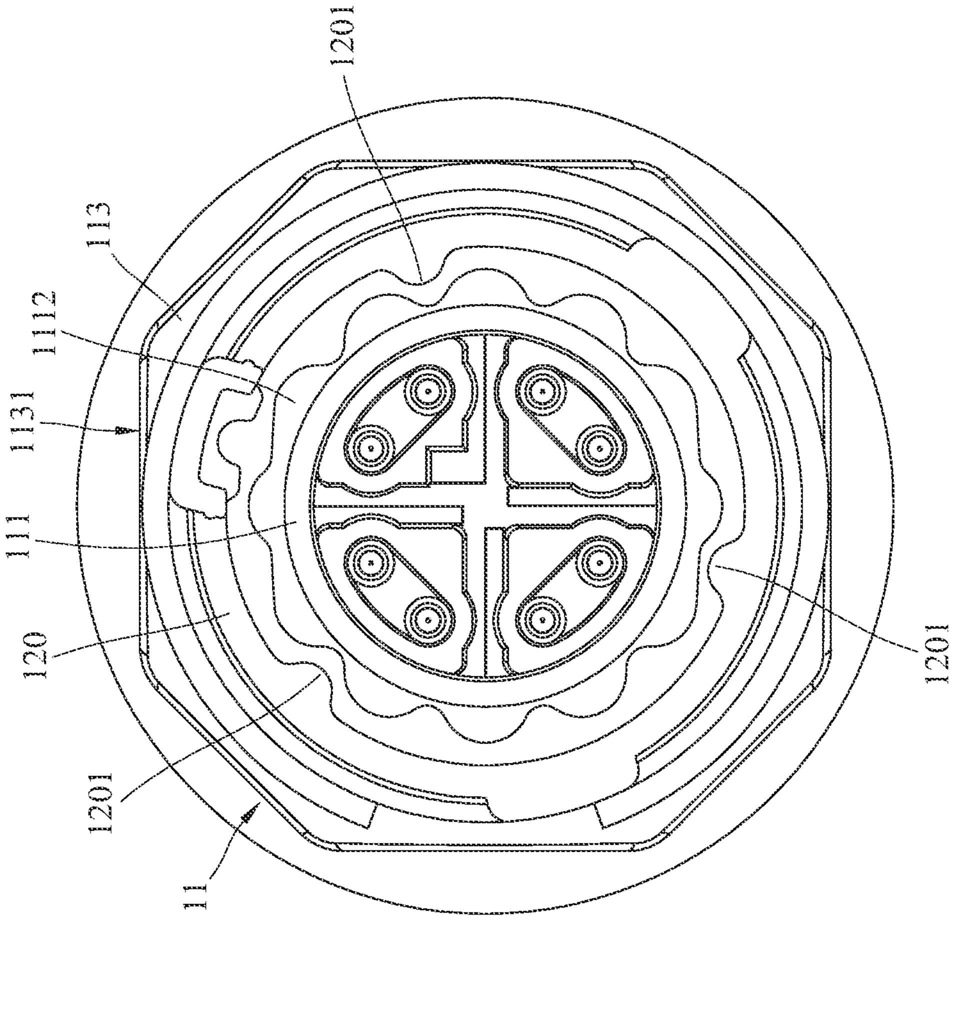
FIG. 7 is a front view of the electrical connector in FIG. 1 when the coupling component is removed.

Then, referring to FIGS. 3, 6 and 7, FIG. 6 is an exploded view of the first casing 11, the positioning component 110, the coupling component 100 and the anti-slip ring 120 in FIG. 2, and FIG. 7 is a front view of the electrical connector 1 in FIG. 1 when the coupling component 100 is removed.

In this embodiment, the accommodation portion 111 of the first casing 11 has an outer annular groove 1111, and the coupling component 100 has an inner annular groove 1001. The coupling component 100 is sleeved on the accommodation portion 111 of the first casing 11, and the inner annular groove 1001 of the coupling component 100 is aligned with the outer annular groove 1111 of the accommodation portion 111. The positioning component 110 is, for example, a C-shaped ring. The positioning component 110 is engaged with the inner annular groove 1001 of the coupling component 100 and the outer annular groove 1111 of the accommodation portion 111, such that the coupling component 100 is rotatably positioned on the accommodation portion 111. The coupling component 100 may further have an outer threaded structure 1002 and a hexagonal profile 1003. A hand tool (e.g., a wrench) can be engaged with the hexagonal profile 1003 of the coupling component 100 to rotate the coupling component 100 for screwing the outer threaded structure 1002 of the coupling component 100 with an inner threaded structure of the joint (not shown) or detaching the coupling component 100 from the joint.

In this embodiment, the accommodation portion 111 of the first casing 11 may further have an annular jagged structure 1112. The anti-slip ring 120 is fixed in the coupling component 100, and the anti-slip ring 120 has a plurality of protrusion structures 1201. During the rotation of the coupling component 100, the anti-slip ring 120 is rotated along with the coupling component 100, such that the protrusion structures 1201 of the anti-slip ring 120 are interfered with the annular jagged structure 1112 of the accommodation portion 111, thereby reducing the rotation speed of the coupling component 100, which suppresses vibration caused by the rotation of the coupling component 100.

Note that the annular wire holder 50, the pressing component 70, the coupling component 100, the positioning component 110 and the anti-slip ring 120 mentioned above are optional components and may be used or omitted according to actual requirements.

According to the electrical connector as discussed in the above embodiment, in the first casing of the outer casing, the accommodation portion and the threaded portion are integrally connected to each other via the connection portion, such that there is no need to assembled the accommodation portion, the threaded portion and the connection portion of the first casing with one another, and sealing rings are not required to be provided at positions where the accommodation portion, the threaded portion and the connection portion are connected, which saves time spending on assembling the accommodation portion, the threaded portion and the connection portion with one another and saves material cost of the sealing rings.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An electrical connector, configured to be assembled with a joint, the electrical connector comprising:

an outer casing, comprising a first casing and a second casing, wherein the first casing comprises an accommodation portion, a threaded portion and a connection portion, the accommodation portion and the threaded portion are integrally connected to each other via the connection portion, the accommodation portion is configured to be assembled with the joint, the threaded portion and the second casing are screwed with each other, and the first casing and the second casing together form an accommodation space;

a seat body, disposed in the accommodation space; and a plurality of insulation-displacement contacts, fixed to the seat body and extending to the accommodation portion;

wherein the first casing has an inner annular surface and a plurality of first engagement blocks, the inner annular surface surrounds the accommodation space and extends from the accommodation portion to the threaded portion, the plurality of first engagement blocks protrude from the inner annular surface, and the seat body is engaged with the plurality of first engagement blocks so as to position in the accommodation space.

2. The electrical connector according to claim 1, wherein the first casing further has a plurality of second engagement blocks, the plurality of second engagement blocks protrude from the inner annular surface, the seat body has a plurality of engagement recesses, the plurality of engagement recesses are arranged along a circumferential direction of the seat body, and the plurality of the second engagement blocks of the first casing are respectively engaged with the plurality of engagement recesses of the seat body.

3. The electrical connector according to claim 1, further comprising a coupling component, wherein the coupling component is rotatably sleeved on the accommodation portion of the first casing, and the coupling component has an outer threaded structure for being assembled with the joint.

4. The electrical connector according to claim 3, further comprising a positioning component, wherein the accommodation portion of the first casing has an outer annular groove, the coupling component has an inner annular groove, the inner annular groove of the coupling component is aligned with the outer annular groove of the accommodation portion, the positioning component is engaged with the inner annular groove of the coupling component and the outer annular groove of the accommodation portion so as to position the coupling component on the accommodation portion.

5. The electrical connector according to claim 3, further comprising an anti-slip ring, wherein the accommodation portion of the first casing has an annular jagged structure, the anti-slip ring is fixed in the coupling component, the anti-slip ring has a protrusion structure, and the protrusion structure of the anti-slip ring is interfered with the annular jagged structure of the accommodation portion.

6. The electrical connector according to claim 3, wherein the connection portion of the first casing has an octagonal profile, and each of the coupling component and the second casing has a hexagonal profile.

7. The electrical connector according to claim 1, further comprising an annular wire holder, wherein the annular wire holder is disposed in the accommodation space, and the plurality of insulation-displacement contacts are inserted into one side of the annular wire holder.

8. The electrical connector according to claim 7, further comprising a pressing component, wherein the pressing component is disposed in the accommodation space and fixed to an another side of the annular wire holder located farther away from the plurality of insulation-displacement contacts, and the pressing component is pressed by the second casing.

9. An electrical connector, configured to be assembled with a joint, the electrical connector comprising:

an outer casing, comprising a first casing and a second casing, wherein the first casing comprises an accommodation portion, a threaded portion and a connection portion, the accommodation portion and the threaded portion are integrally connected to each other via the connection portion, the accommodation portion is configured to be assembled with the joint, the threaded portion and the second casing are screwed with each other, and the first casing and the second casing together form an accommodation space;

a seat body, disposed in the accommodation space; and a plurality of insulation-displacement contacts, fixed to the seat body and extending to the accommodation portion;

wherein the electrical connector further comprises an annular wire holder, the annular wire holder is disposed in the accommodation space, and the plurality of insulation-displacement contacts are inserted into one side of the annular wire holder;

wherein the electrical connector further comprises at least one ground sheet, wherein the annular wire holder has an outer annular surface and a rib, the rib protrudes from the outer annular surface, the at least one ground sheet is movably disposed on the annular wire holder and is in electrical contact with the first casing, the at least one ground sheet has a positioning slot, and the positioning slot of the at least one ground sheet is configured to be engaged with the rib of the annular wire holder.

* * * * *